United States Patent Office 2,824,898
Patented Feb. 25, 1958

2,824,898

REMOVAL OF SOAP FROM OXO BOTTOMS BY SOLID ADSORBENTS

Rhea N. Watts, St. Francisville, La., assignor to Esso Research and Engineering Company, a corporation of Delaware No Drawing. Application February 24, 1956
Serial No. 567,447

7 Claims. (Cl. 260—643)

This invention relates to the removal of certain precipitate-forming components in high boiling oxygenated organic solvents. More particularly, this invention relates to the selective removal of soap from Oxo bottoms contaminated therewith by contact with solid adsorbents having certain physical characteristics.

Oxo bottoms which are described below are recognized as exceptional solvents for various herbicidal, fungicidal and the like compounds, such as pentachlorphenol, 2,4-dichlorphenoxy acetic acid and 2,4,5 trichlorphenoxy acetic acid. One of the primary difficulties encountered when using Oxo bottoms as a solvent for the above and similar compounds, is the formation of highly objectionable precipitates. These precipitates cause considerable trouble especially when spraying equipment is used. Precipitates of the character described above may be avoided if the Oxo bottoms are distilled extensively; however, this procedure obviously wastes a large percentage of otherwise valuable Oxo bottoms product and in most cases, the cost of such a process is prohibitive.

It has been discovered that Oxo bottoms containing objectionable precipitate-forming soaps may be treated with certain solid adsorbents having particular pore size characteristics to selectively remove these soap contaminants.

Oxo bottoms

It is now well known in the art that oxygenated organic compounds may be synthesized from olefins by a reaction of the latter with carbon monoxide and hydrogen in the presence of a catalyst containing cobalt in a two stage process to produce compounds having one more carbon atom than the starting olefinic material. The literature is rich with information regarding the various modifications of the Oxo or carbonylation process and reference may be had to Bureau of Mines publication dated June 1948, entitled "Critical Review of the Chemistry of Oxo Synthesis for the Production of Alcohols from Olefins, Carbon Monoxide and Hydrogen." A typical procedure for the production of alcohols and higher molecular weight bottoms by the Oxo process follows:

A $C_7$ olefin is reacted with hydrogen and carbon monoxide 1.25 to 1, at 3,000 p. s. i. and 300° F. in the presence of a cobalt oleate catalyst in the amount of 0.1 to 0.2 wt. percent expressed as cobalt metal. The product resulting from this first step is predominantly aldehydic but contains other oxygenated compounds including alcohols. This aldehydic product is then hydrogenated in the presence of a catalyst such as 10% molybdenum sulfide on activated char under a hydrogen pressure of 3,000 p. s. i. and a catalyst bed temperature of about 375 to 520° F. to produce the alcohols. The product resulting from this hydrogenation step is primarily $C_8$ alcohols but also contains unreacted olefins particularly branch chain olefins, paraffins, esters, ethers, dimer alcohols, acetals and residual soaps from the catalyst introduced in the first step. The hydrogenated product is then distilled to separate a major portion of the $C_8$ alcohols from the other components. To minimize corrosion in the distillation equipment, a caustic wash is usually employed to neutralize acids. However, this caustic wash adds more objectionable precipitate forming soap to the system. The bottoms or higher boiling cut from the distillation of the alcohol product which may comprise 15 to 30% of the entire hydrogenated product will contain the higher boiling alcohols, esters, ethers, soaps and the like. It is this bottoms cut which is referred to conventionally and herein as Oxo bottoms. Bottoms from an Oxo process for the preparation of a $C_X$ alcohol is referred to herein as $C_X$ Oxo bottoms. A typical composition of $C_8$ Oxo bottoms from a process such as described above is as follows:

| | Percent by weight |
|---|---|
| $C_8$ alcohols | 10 |
| $C_{16}$ dimer alcohols | 40 |
| Esters | 23 |
| $C_{16}$ ethers | 20 |
| Soaps | 2 |
| Higher $C_8$ homologues | 5 |

The composition of Oxo bottoms may vary considerably depending on the particular boiling range of the cut taken as well as the operating conditions within the system. In general, however, $C_8$ Oxo bottoms contaminated with soap which fall within the scope of the present invention may be typified by the following approximate composition:

| | Range, percent |
|---|---|
| $C_8$ alcohols | 5–25 |
| $C_{16}$ dimer alcohols | [1] 0–40 |
| Esters | 0–40 |
| $C_{16}$ ethers | 0–20 |
| Soaps | [1] 0–10 |

[1] These figures will be 0 only when the caustic wash is omitted.

It is to be understood that the above typical composition represents Oxo bottoms resulting from a process employing a $C_7$ olefin feed. This invention is applicable also to $C_4$–$C_{10}$ Oxo bottoms which result from the Oxo process employing $C_3$–$C_9$ olefinic materials as the feed as well as other alcoholic solvents contaminated with soaps.

Solid adsorbents

In general, the chemical composition of the particular adsorbents useful for the purpose of the present invention, i. e., to selectively remove precipitate-forming soaps from Oxo bottoms, is secondary. It is only necessary, that the adsorbents contain average pore diameters of from 60 to 110 A. Typical of the adsorbents which conventionally contain average pore diameters within the necessary range are silica-alumina cracking catalysts having a low alumina content, e. g., 5 to 25 wt. percent and 20% boria on silica-alumina (1:1). While gels of many metal oxides prepared by conventional methods and other solid adsorbents have average pore diameters too small to be of utility in this process, there are known methods of enlarging the pore diameters. These methods include steaming, slow aging processes, dehydrogenation at reduced pressures, displacing water in the set gel with butanol and the like before drying and the addition to the gel of a third component which can be washed out after the gel is set.

Attapulgus clay, a kaolin consisting largely of alumina silicates may be treated to produce an adsorbent having approximately 85 A. average pore diameter. The following method of preparing an adsorbent having the desired pore diameter is illustrative. It is to be understood that this invention is not concerned with any particular method of preparing adsorbents, but rather with the use of adsorbents having certain physical properties.

Common commercial silica-alumina cracking catalysts having pore diameters within the desired range are readily available and inexpensive. Moreover, these catalysts, besides removing soaps will break emulsions and absorb small amounts of water which may be present in the Oxo bottoms. Accordingly, silica-alumina cracking catalysts are preferred as adsorbents for this process.

*Example.*—Fresh silica-alumina 87–13% having a pore diameter of about 40 A. is treated with steam and heat at 510° C. for a period of 24 hours, to produce a silica-alumina adsorbent having an average pore diameter of 100 A.

For a more detailed discussion of various processes for preparing solid adsorbents having a pore size over about 60 A., reference is made to U. S. Patent 2,469,314 to Ryland et al. In the above patent, general and specific examples of regulating and calculating pore size are given, and such disclosure is incorporated herein. It will be noted, however, that the formula in col. 4 of said patent should read as follows:

$$D = \frac{4V}{S} \times 10^4$$

where:

D is the average pore diameter in Angstroms.
V is the pore volume in cc./gm.
S is the specific surface in m.²/gm.

The process of the present invention involves contacting a soap contaminated oxygenated solvent and especially Oxo bottoms with very small amounts of a solid adsorbent having the pore diameter range recited above. The amount employed, of course, will depend upon the amount of soap contained in the Oxo bottoms. However, in general, from 3 to 20 lbs. of adsorbent per 100 lbs. of Oxo bottoms may be employed. The adsorbent is removed from the soap free Oxo bottoms by filtration, decantation or other similar means. Regeneration of adsorbents may be accomplished by treatment with hot water and may be hastened by the addition of a low molecular weight alcohol. Contacting may be accomplished by simple admixture, percolation, etc.

*Example.*—100 lbs. of a $C_8$ Oxo bottoms product resulting from a process such as described above and having the following typical composition was admixed with a 10 lbs. of a silica-alumina (87%–13%) adsorbent having an average pore size diameter of 85 A. for a period of 5 minutes. The mixture was filtered and the filtrate was analyzed as follows:

|  | Before, percent | After, percent |
|---|---|---|
| $C_8$ Alcohols | 10 | 10 |
| $C_{16}$ Dimer Alcohols [1] | 40 | 43 |
| Esters | 23 | 24 |
| Ethers | 20 | 21 |
| Soaps [2] | 2 | 0 |
| Higher $C_8$ Homologues | 5 | 2 |

[1] Loss of alcohol was determined by hydroxyl number.
[2] The presence or absence of soap in the filtered sample after contact was tested by the addition of water to show the sample and the use of a phenolphthalein indicator to show alkali present.

Oxo bottoms, before or after treatment, have remarkable solvent properties. For example, pentachlorphenol was dissolved in the above untreated Oxo bottoms to form a 50% solution. This solution afterward was diluted with diesel fuel for treating wood products to protect them against termites or fungi. The final concentration of the diluted solution was 1% pentachlorphenol. When untreated Oxo bottoms were employed as the solvent, an objectionable precipitate formed which was sufficient to cause considerable clogging in spray equipment. The same solution was made up with the treated Oxo bottoms and no precipitate resulted. To show that the selective soap removal qualities of the adsorbents tested were attributable to the particular pore diameter, Oxo bottoms were contacted with the following adsorbents:

|  | Average Pore Diameter, A. | Selective Complete Soap Removal |
|---|---|---|
| Activated Carbon | 20 | No. |
| Activated Alumina | 54 | No. |
| High (40%) Alumina-Silica Cracking Catalyst | 36 | No. |
| 20% Alumina-Silica Cracking Catalyst | 85 | Yes. |
| 13% Alumina-Silica Cracking Catalyst | 92 | Yes. |
| Filtrol | 55 | No. |
| 13 A. Molecular Sieve, Linde | 13 | No. |
| Silica Magnesia Cracking Catalyst | 31 | No. |
| Chromia Gel | 27 | No. |
| Socony Vacuum Bead 13% $Al_2O_3$-$SiO_2$ Catalyst | 50 | No. |
| Silica Gel | 19 | No. |
| 20% Boria Catalyst (On 50% $SiO_2$, 50% $Al_2O_3$) | 95 | Yes. |
| Attapulgus Clay | 54 | No. |

Only those adsorbents having an average pore diameter of over 60 A. selectively and completely removed soaps from the Oxo bottoms. Other absorbents having an average pore size in the range of 54 to 20 A. may remove some soap, however, they also remove a considerable amount of dimer ($C_{16}$) alcohols and thus are unsatisfactory for the present purposes.

In the above table, activated carbon activated alumina, high (40%) alumina-silica cracking catalyst, Filtrol, 13 A. molecular sieve and silica-magnesia cracking catalyst, all of which have average pore diameters below about 56 A., removed desirable dimer alcohols from the Oxo bottoms.

It is to be understood that the present process may be applied to alcohol containing solvents other than Oxo bottoms wherein said solvents are contaminated with precipitate forming soaps.

What is claimed is:

1. A method of treating an oxygenated solvent containing alcohol as a principal component, said solvent being contaminated with a minor amount of precipitate-forming soap which comprises contacting said solvent with a solid adsorbent having an average pore diameter between about 60–110 A. to selectively adsorb said soap and separating the soap free solvent from the adsorbent.

2. A method in accordance with claim 1 wherein said solvent is Oxo bottoms.

3. A method in accordance with claim 1 wherein the said average pore diameter is between about 85 to 100 A.

4. A method in accordance with claim 3 wherein from 3 to 20 lbs. of adsorbent per 100 lbs. of solvent are employed.

5. A method of separating precipitate-forming amounts of soap from Oxo bottoms contaminated with said soap which comprises contacting said contaminated Oxo bottoms with a solid absorbent having an average pore diameter of about 60–110 A. to selectively adsorb said soap therefrom and separating the soap free Oxo bottoms from the adsorbent.

6. A method in accordance with claim 5 wherein said solvent is $C_8$ Oxo bottoms.

7. A method in accordance with claim 6 wherein said adsorbent is silica-alumina.

References Cited in the file of this patent

UNITED STATES PATENTS

| 2,530,042 | Blinoff | Nov. 14, 1950 |
| 2,575,282 | McKay et al. | Nov. 13, 1951 |
| 2,626,284 | Smith | Jan. 20, 1953 |

OTHER REFERENCES

Drake et al.: Ind. Eng. Chem. (Anal. Edit.), vol. 17 (1945), p. 782–91.